No. 724,621. PATENTED APR. 7, 1903.
R. SHEDENHELM.
BAND CUTTER AND FEEDER.
APPLICATION FILED APR. 15, 1901.

NO MODEL. 5 SHEETS—SHEET 2.

Witnesses:
N. G. Orwig.
L. H. Orwig.

Inventor: Robert Shedenhelm
By Thomas G. Orwig, Attorney.

No. 724,621. PATENTED APR. 7, 1903.
R. SHEDENHELM.
BAND CUTTER AND FEEDER.
APPLICATION FILED APR. 15, 1901.

NO MODEL. 5 SHEETS—SHEET 3.

UNITED STATES PATENT OFFICE.

ROBERT SHEDENHELM, OF DES MOINES, IOWA.

BAND-CUTTER AND FEEDER.

SPECIFICATION forming part of Letters Patent No. 724,621, dated April 7, 1903.

Application filed April 15, 1901. Serial No. 55,835. (No model.)

*To all whom it may concern:*

Be it known that I, ROBERT SHEDENHELM, a citizen of the United States, residing at Des Moines, in the county of Polk and State of Iowa, have invented a new and useful Automatic Band-Cutter and Feeder, of which the following is a specification.

The objects of my invention are, first, to provide an improved band-cutter and feeder of simple, durable, and inexpensive construction that may be automatically operated to feed bundles of grain to a threshing-cylinder in an even and uniform manner.

A further object is to provide an improved speed-governor of simple, durable, and inexpensive construction designed to automatically stop the movements of the conveyer when the speed of the threshing-machine from which the band-cutter and feeder is driven when the speed of the former falls below a certain predetermined rate, and when the speed of the threshing-machine again attains a certain predetermined rate the conveyer of the band-cutter and feeder will be automatically started.

A further object is to provide an improved feed-governor of simple, durable, and inexpensive construction whereby when an excessive quantity of grain is in the band-cutter and feeder the conveyer of the band-cutter and feeder will be automatically stopped until the excessive quantity of grain has been reduced and fed to the threshing-cylinder, whereupon the feed-governing mechanism will be automatically released to permit further operation of the machine. In this connection it is my object to combine the speed-governor and the feed-governing mechanism in such manner that the same trip device on the conveyer driving-shaft may be used for each of said governing devices.

A further object is to provide an improved endless conveyer for band-cutters and feeders so arranged that bundles carried on opposite sides of the conveyer will be fed to the threshing-cylinder alternately instead of side by side, as with the ordinary machine, to thereby avoid feeding grain to the threshing-machine in large quantities and providing a comparatively even and steady flow of grain to the threshing-cylinder.

A further object is to provide improved band-cutting mechanism, which mechanism is so arranged that in addition to its function of cutting the bands it will advance the central portion of the grain upon the conveyer faster than the grain at the sides of the conveyer, so that the layer of grain upon the bottom of the band-cutter and feeder will be fed to the threshing-machine in a substantially V-shaped figure with the apex forward.

A further object is to provide improved feeding-pans for conveying the grain from the end of the conveyer to the threshing-cylinder, whereby the central portion of the layer of grain upon the feeding-pans is advanced more rapidly than the side portions, so that a bundle of grain would be fed to the thresher in a V-shaped figure with its apex forward.

A further object is to provide means for retarding the top layer of grain as it enters the threshing-cylinder, so that the under layer of the grain will be engaged by the cylinder first, thereby providing a machine in which the heads of the grain of both the top and lower layers will be engaged by the cylinder before the stalks. In this connection it is to be remembered that in machines where the upper and lower layers are fed to the threshing-cylinder at the same time the stalk portions of the upper layer of grain will cover the heads of the lower layer of grain in such manner that the threshing-teeth must strike the lower layer through the heavy body of grain-stalks, so that threshing is made more difficult and the separation is not thorough.

A further object is to provide means for retarding the top layer of grain, which means shall be so arranged that the threshing-cylinder cannot pull a tangled mass of grain into the cylinder, but said mass will be engaged by the retarding-hooks and the threshing-cylinder at about the same time, so that the mass must be torn apart before it can be fed to the cylinder; and in this connection it is my object, further, to provide means whereby the sides of a layer of grain in the band-cutter and feeder are retarded more than the center, so that a bundle of grain in the band-cutter and feeder will be fed to the threshing-machine in a V-shaped figure with its apex forward.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 7:
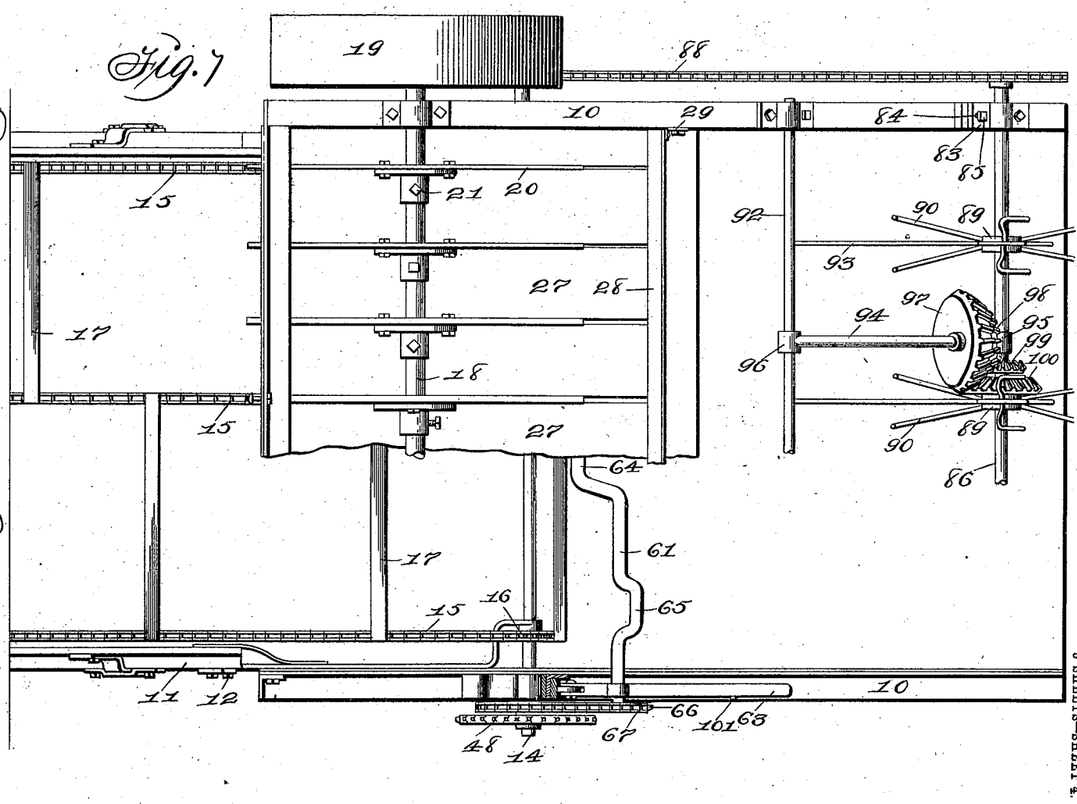
Fig. 7 shows a plan view of the complete machine with the outer end of the conveyer-frame removed and with parts of the band-cutting knives and their guards and all of the feeding-pans removed to illustrate the means for driving the feeding-pans.
Figures 8, 9, 10, 11, 12, 13:
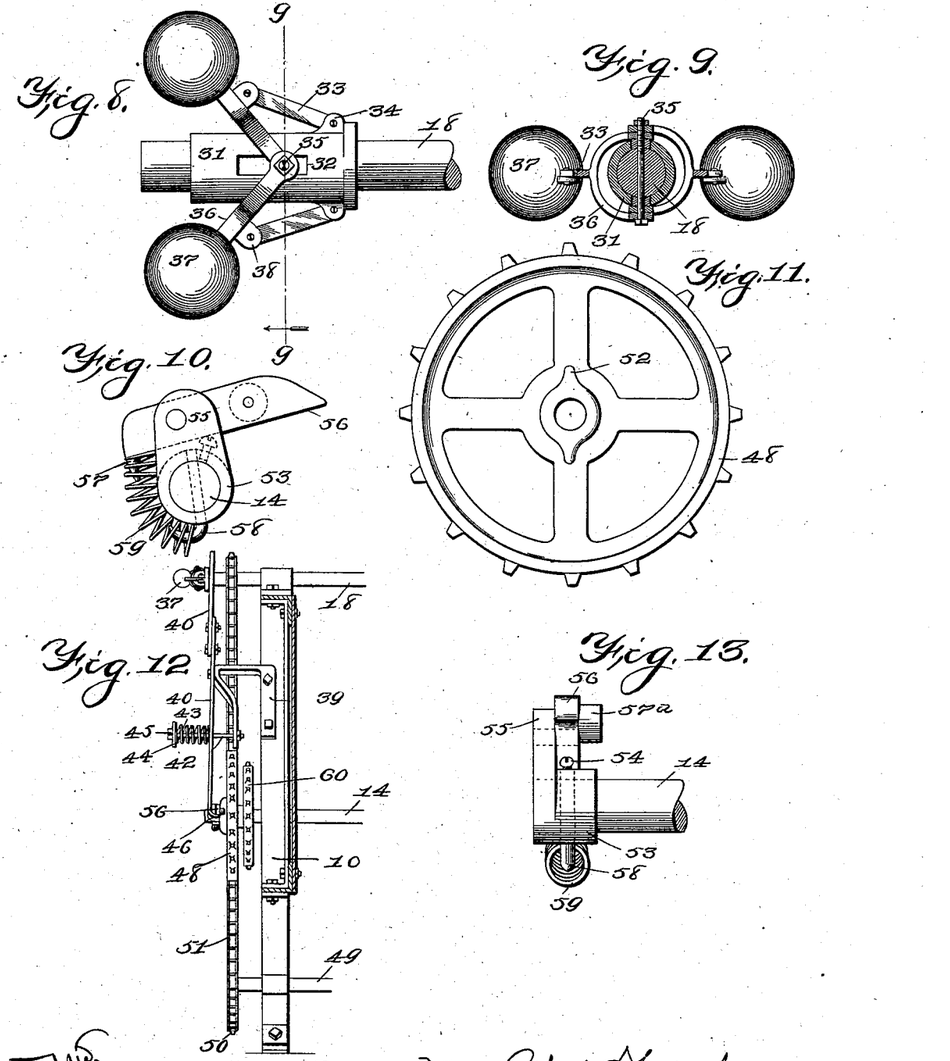
Fig. 8 shows a side elevation of the ball-governor.
Fig. 9 shows a transverse sectional view of same through the indicated line 9 9 of Fig. 8.
Fig. 10 shows an enlarged detail elevation of the trip device attached to the conveyer-shaft.
Fig. 11 shows a side elevation of the sprocket-wheel to be attached to the conveyer-shaft and to be engaged by said trip device.
Fig. 12 shows a vertical sectional view of one side of the machine-frame to illustrate the speed-governing mechanism.
Fig. 13 shows an enlarged detail view illustrating the end portion of the conveyer-shaft with the trip device thereon.

Referring to the accompanying drawings, the reference-numeral 10 is used to indicate the frame of the machine, which is preferably made of metal and designed to be secured to a threshing-machine. The particular configuration of the machine-frame is not essential, and hence will not be described in detail. Pivoted to the outer end of the machine-frame is a conveyer-frame 11, of ordinary construction, hinged at 12 to be capable of vertical movement, and the dividing-board 13 is supported above the conveyer-frame in the usual manner. The conveyer is driven from a shaft 14, mounted in suitable bearings in the sides of the machine-frame and driven by mechanism hereinafter described. The conveyer proper is composed of three endless chains 15, which travel over sprocket-wheels 16 on the shaft 14, one of which sprocket-wheels is shown in Fig. 7. A series of cross-strips is attached to the said endless chain, and said strips are of a length to extend from the central chain 15 to one of the outer chains. Said strips are indicated by the reference-numeral 17, and the strips on one side of the conveyer are arranged between the strips on the opposite side, and the spaces between the strips on each side are substantially the same or greater than the length of the ordinary bundle of grain. In practical use with this portion of the device it is obvious that as the bundles of grain are thrown from opposite sides into the conveyer-frames they will be forced by the dividing-board to assume a position on opposite sides of the center of the conveyer, and obviously the bundles will rest upon the bottom of the conveyer-frame until they are engaged by one of the cross-strips, and the arrangement of the cross-strips on the opposite sides is such that the bundles on one side will not enter the machine-frame side by side.

Figure 1:
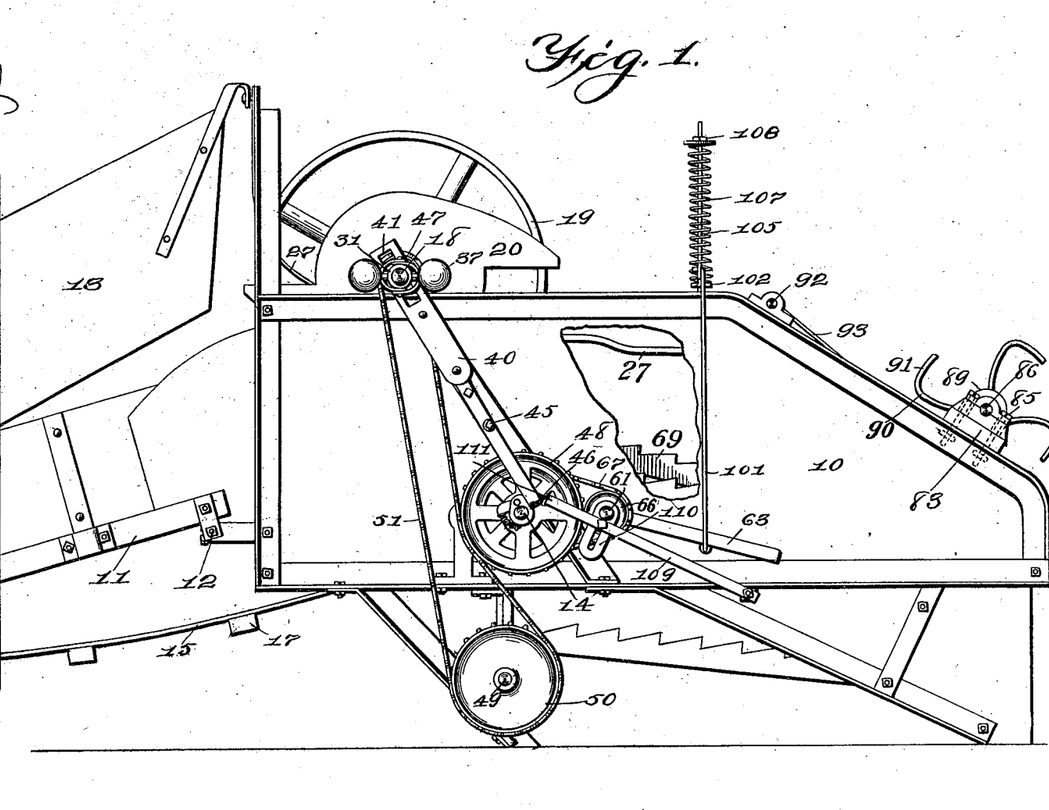
Figure 1 shows a side elevation of the complete machine, except that the outer end of the conveyer-frame is not illustrated.
Figure 2:
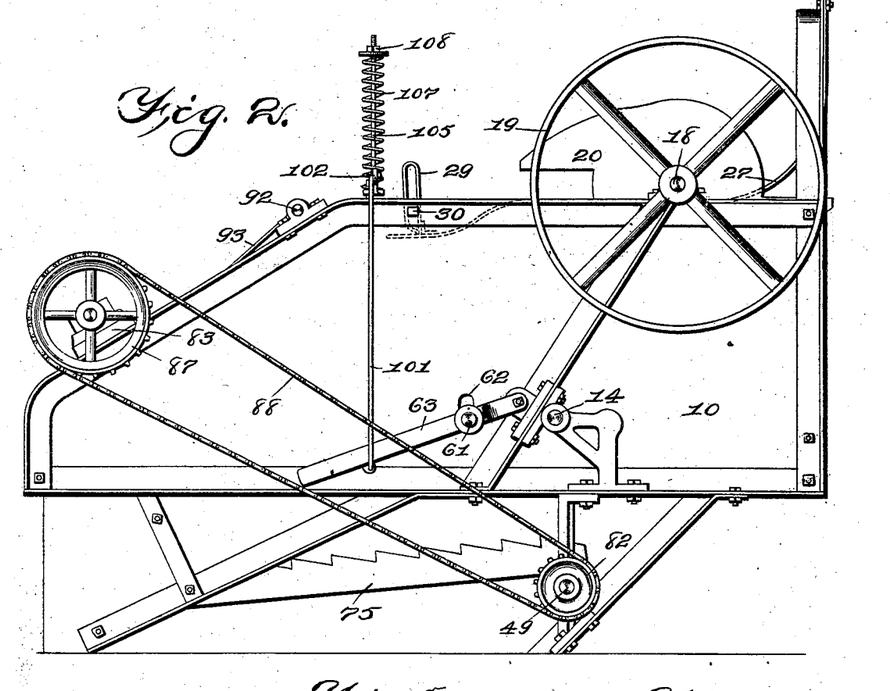
Fig. 2 shows a side elevation of the opposite side of the machine-frame with the conveyer-frame omitted.
Figure 3:
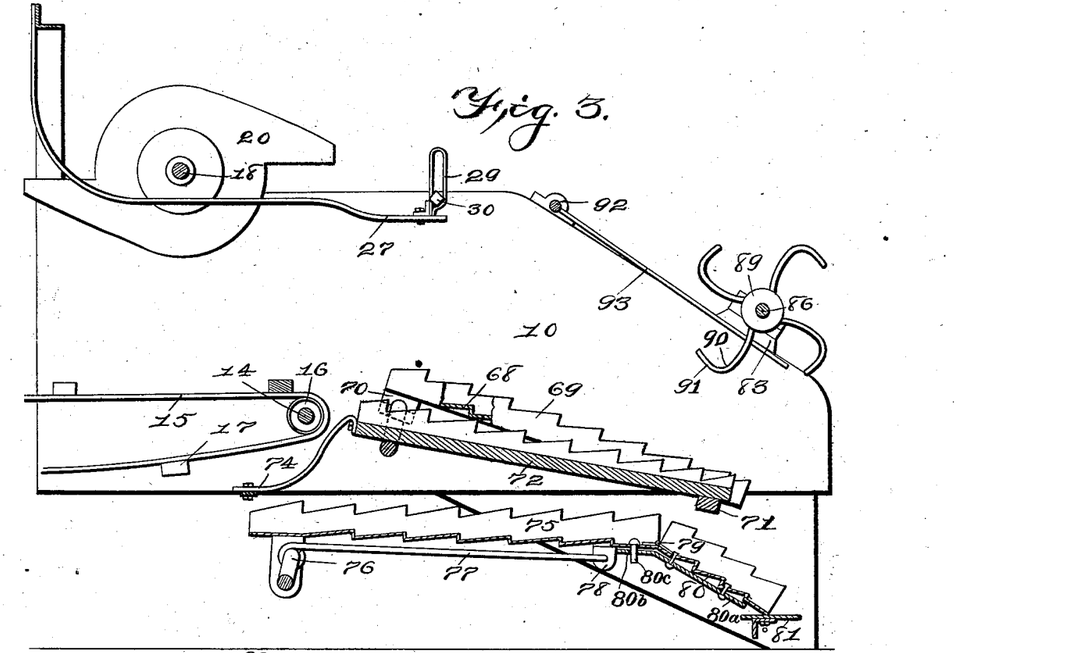
Fig. 3 shows a vertical central longitudinal sectional view through the complete machine with the conveyer-frame omitted.
Figures 4, 14:
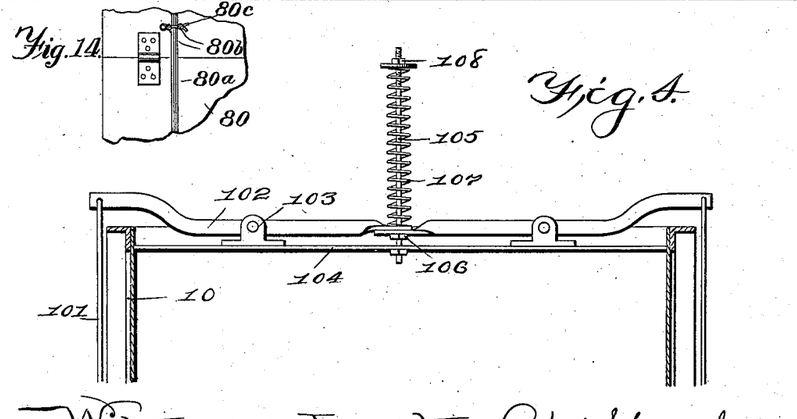
Fig. 4 shows a vertical transverse sectional view of a portion of the machine-frame to illustrate the yielding pressure device for controlling the feed-governor.
Fig. 14 shows an inverted detail view of a portion of the shaking-pans.
Figure 5:
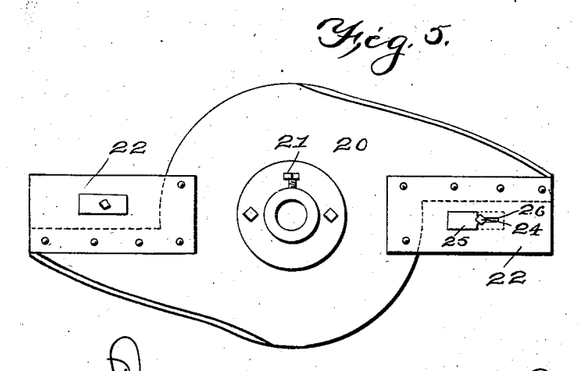
Fig. 5 shows a side elevation of one of the band-cutting knives to be attached to the center of the knife-shaft.
Figure 6:
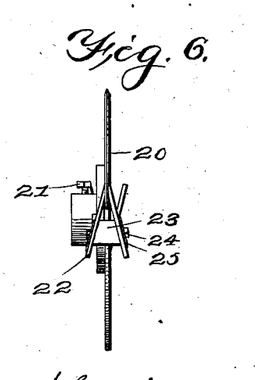
Fig. 6 shows an edge view of same.

Mounted upon the machine-frame directly above the inner end portion of the conveyer is the shaft of the band-cutting knives, (indicated by the reference-numeral 18.) At one end of said shaft is a belt-wheel 19, by which the machine is connected with the threshing-machine, and all of the operative parts of the machine are driven from this shaft. The band-cutting knives are of the usual construction and are indicated by the reference-numeral 20. They are secured to the shaft 18 by means of the set-screws 21. This description applies only to a portion of the band-cutting knives. The remaining knives, preferably two or three in the center, differ from the ordinary band-cutting knives as follows: Referring to Figs. 5 and 6 of the drawings, it will be noted that I have fixed to the back edge of each blade of the knife a pair of sheet-metal wings 22 to project outwardly and rearwardly relative to the line of advance of the knives. The rear edges of said wings are held apart by means of a wedge-shaped block 23, held in place by means of the set-screws 24, which set-screws are seated in the sliding plates 25 and pass through the slots 26 in said wings. By this means it is obvious that the width of the wings may be adjusted by moving the sliding blocks to and from the shaft. These wings are provided on the central knives for the purpose of throwing the grain on the central portion of the conveyer forward faster than the grain at the sides of the conveyer, the advantages of which will be made clear hereinafter.

Mounted between each pair of knives is a flat sheet-metal guard 27, designed to fill the space between the knives and prevent the grain from becoming tangled in the knives. The rear end portions of these guards project substantially in a horizontal plane and are connected by means of the cross-piece 28. At the ends of the cross-piece 28 are the slotted uprights 29, through which the bolts 30 are passed. Said bolts 30 also project through sides of the machine-frame, and obviously by a manipulation of said bolts the said cross-piece may be adjusted vertically, thereby moving the guards jointly relative to the conveyer. On the opposite end of the shaft 18

I have mounted a centrifugal ball-governor comprising the sliding sleeve 31, having longitudinal slots 32 in its sides and the arms 33, pivoted to the lugs 34. Passed through the shaft 18 is a bolt 35, to which the yokes 36 are pivoted. On the outer ends of said yokes are the balls 37, and the arms 33 are pivoted to the lugs 38 on said yokes. By this arrangement it is obvious that on a rapid revolution of the shaft 18 the balls 37 will be thrown outwardly by centrifugal force and the sleeve moved thereby longitudinally upon the shaft. Mounted on the machine-frame beneath the said shaft 18 is a bracket 39, and a lever 40 is fulcrumed to said bracket. The upper end of this lever is provided with a slot 41, which slot encircles the shaft 18 and lies adjacent to the end of the sleeve 31. Fixed to the bracket 39 below the pivotal point of the lever 40 is a rod 42, passed through an opening in the lever 40, and an extensile coil-spring 43 is mounted on said rod with one end in engagement with the said lever and the other end in engagement with the washer 44, which washer is held in place by a nut 45 on the rod 42. The lower end of the lever 40 is inclined inwardly toward the machine to form a hook 46, for purposes hereinafter made clear.

The shaft 14, which drives the conveyer, as before described, is operated by means of the following gearing device: On the shaft 18 is a sprocket-wheel 47. A large sprocket-wheel 48 is rotatably mounted upon the shaft 14, and beneath the shaft 14 is a shaft 49, extended transversely of the machine-frame and having on one end a sprocket-wheel 50. A sprocket-chain 51 passes around the wheel 47 on the shaft 18 and around the wheel 50 on the shaft 49, the said wheel 50 being arranged relative to the sprocket-wheel 48 in such manner that the chain will engage a part of the surface of the sprocket-wheel 48 to operate the shaft 14. Fixed to the hub of the shaft 49 are two radial rounded projections 52.

I have provided means whereby the sprocket-wheel 48 may be automatically clamped to the shaft 14 to rotate in unison therewith or be released therefrom to rotate independently, as follows: Fixed to the shaft 14, adjacent to the side of the sprocket-wheel 48 upon which the rounded projections 52 are formed, is a hub 53, having an integral arm 55. Pivoted in the integral arm 55 is a lever 56, having a rounded outer end and also having a projection 57 at its other end. On the outer end of the lever 56 is a laterally-projecting roller 57ª, for purposes hereinafter made clear, and fixed to the hub 53 is a curved projection 58, which is passed through the shaft to secure the hub to the shaft, and an extensile coil-spring 59 is placed in position with one end in engagement with the projection 57 and the other end in engagement with the projection 58, thereby tending to normally hold the roller end of the lever 56 toward the hub 53. This device is clamped to the shaft 14 in a position where the roller 57 will normally engage the projections 52, but may be moved out of engagement therewith by swinging the outer end of the lever 56 away from the hub and in a direction against the pressure of the spring 59. The hook 46 on the lever 40 is designed to normally engage the outer end of the lever 56 and normally hold the roller 57 out of engagement with the projections 52, so that when the machine is started the conveyer will not be rotated until the ball-governor attains such speed as to operate the lever 40 against the spring 43 in such manner as to withdraw the hook 46 from engagement with the lever 56. When this is done, obviously the spring 59 will operate to force the lever 56 in position where the roller 57 will engage one of the rounded projections 52, and thereby cause the sprocket 48 to rotate the shaft 14 in unison with it. Obviously the shape of the rounded projections 52 is such that if it should strike the roller 57 when going at a very rapid speed the roller might be forced upwardly against the pressure of the spring 59 sufficiently to permit the sprocket 48 to turn one or more complete revolutions before the sprocket-wheel and lever 56 are firmly clamped together, thereby avoiding sudden shocks to the machinery. The set-screw 54 limits the movement of the lever 56. Loosely mounted on the shaft 14 is a sprocket-wheel 60, the function of which will be made clear hereinafter. The shaft of the shaking-pans is indicated by the reference-numeral 61. The ends of the crank-shaft 61 are passed through the slots 62 in the sides of the machine-frame and having its bearings in the arms 63, which arms are pivoted to the machine-frame and project downwardly and toward the outer end of the machine-frame. In the central portion of the shaft 61 I have formed one or more crank-arms 64 of considerable length, and in the end portions of the crank-shaft 61 I have formed two or more crank-arms 65 of less length, for purposes hereinafter made clear. On one end of the shaft 61 is a sprocket-wheel 66, connected with the sprocket-wheel 60 by means of the sprocket-chains 67, so that the shaft of the shaking-pans is rotated simultaneously with the sprocket-wheel 48. Mounted upon each of the crank-arms 64 and 65 is an independent shaking-pan, preferably made of a strip of sheet metal having corrugated bottom 68 and sides 69, having toothed top edges. At one end of the shaking-pan thus formed is a bearing-box 70, which is mounted on one of the crank-arms 64 or 65. These shaking-pans are arranged at some distance apart throughout the entire width of the machine-frame, and the outer ends thereof are slidingly supported by the cross-piece 71. Between each pair of shaking-pans is a stationary flat bar 72, with one end bolted to the cross-piece 71 and the other end supported upon a cross-piece 74, fixed to the sides of the machine-frame.

These bars 72 and shaking-pans are positioned so as to receive the discharge from the endless conveyer, and obviously by reason of the greater length of the cranks that operate the central pans the said central pans will be moved in a larger circle, and hence will advance grain resting upon them faster than the grain resting upon the outer shaking-pans. Beneath these shaking-pans and bars is a flat receiving-pan 75, supported in such manner as to be capable of sliding movement. I have provided means for operating this pan 75, as follows: On the central portion of the shaft 49 is a crank-arm 76, and a pitman 77 extends from said crank-arm to a lug 78 on the under surface of the pan 75, to which it is pivoted. Connected with the outer end of the pan 75 by means of a hinge 79 is an auxiliary pan 80, the outer end of which is slidingly mounted upon a platform 81. By means of the shaking-pans just described it is obvious that the grain will be carried from the conveyer to the threshing-cylinder and, furthermore, that the central portion of the layer of grain will be advanced more rapidly than the side portions of said layer. I have also provided means whereby access may be had to a threshing-cylinder quickly and easily by lowering the under feeding-pans. To this end the under feeding-pan 75 is provided with the extension 80, connected with the pan 75 by means of the hinge 79, said hinge 79 being arranged to permit the outer section 80 to swing upwardly over the top of the part 75. Before this can be done the pan 75 must be lowered. In this connection also it is desirable to have the part 80 inclined downwardly at a much greater angle than the part 75, so as to prevent the wind from a threshing-cylinder from blowing grain backwardly on the feeding-pan and to aid in feeding grain to the threshing-cylinder. Fixed to the under surface of the outer pan 80 is a series of levers 80$^a$. These levers project upwardly and away from the threshing-cylinder and then incline almost straight horizontally, and each lever passes through between a pair of bolts 80$^b$, fixed to the under surface of the pan 75 and having a cotter-pin 80$^c$ passed through their lower ends to receive the said lever 80$^a$. Hence it is obvious that so long as the cotter-pins 80$^c$ are in position the levers 80$^a$ will be held flat against the under surface of the parts 75 and 80, thus holding the part 80 at a considerable angle relative to the part 75. When it is desired to obtain access to the threshing-cylinder, the operator simply removes the cotter-pins 80$^c$, and then the part 75 may swing downwardly, because the part 80 may fold over on top of the part 75, and the supporting means for the joint between these two parts will have been taken away. I have also provided means for supplying a force-feed to apply to the top portion of the layer of grain upon the feed-pans in such manner as to positively force said layer of grain upon the feed-pans toward the cylinder and at the same time to prevent the grain from being drawn into the threshing-cylinder in too great quantities, as follows: On one end of the shaft 49 is a sprocket-wheel 82, and on top of the machine-frame, directly above the rear end portions of the feeding-pans, are the bearing-blocks 83, having slots 84, through which the bolts 85 are passed into the machine-frame, whereby the bearing-blocks may be moved longitudinally upon the machine-frame. A shaft 86 is mounted in these bearing-blocks, and a sprocket-wheel 87 is fixed to one end thereof. A sprocket-chain 88 connects the wheels 82 and 87. Obviously the slotted bearings provide means whereby the tension of the chain 88 may be adjusted, and, furthermore, if it is desired to change sprocket-wheels, so as to provide larger or smaller gear, this adjustable feature is advantageous in providing quick adjustment of the chain. Mounted upon the shaft 86 are a number of feeding devices, each of which comprises a hub 89. Projecting from the hub 89 in a radial direction are a number of pairs of arms 90, which arms are arranged to incline outwardly from each other. At their outer ends these arms are curved in a direction substantially concentric with the shaft, said ends being indicated by the reference-numeral 91. Fixed to the machine-frame at some distance from the shaft 86 is a cross-bar 92, and fixed to this cross-bar is a series of rods 93 to project under the shaft 86. One of these bars passes directly under each of the hubs 89 and between the arms 90. I preferably provide three of said feeding devices, the two outer ones being fixed to the shaft 86 and the central one being loosely mounted thereon. I have provided means whereby this central feeding device may be rotated more rapidly than the outer feeding device, as follows: The reference-numeral 94 indicates a rod having its ends 95 and 96 fixed, respectively, on the shaft 86 and the cross-bar 92. Loosely mounted upon this rod 94 is a bevel gear-wheel 97 and the small bevel gear-wheel 98, which is fixed to the wheel 97. Keyed to the shaft 86 is a small bevel gear-wheel 99, which is meshed with the small bevel gear-wheel 98, and fixed to the hub 89 of the central feeding device is a large bevel gear-wheel 100, meshed with the bevel gear-wheel 97. These gear-wheels 98 and 99 are preferably made about half the size of the gear-wheels 97 and 100. Hence, obviously, the central feeding device will be rotated at about twice the speed of the outer feeding device. In use these feeding devices are preferably arranged to advance the top layer of grain at less speed than the feeding-pans will advance the lower layer of the grain. By this means the heads of the grain are exposed to the action of the threshing-cylinder even if the grain is fed to the threshing-cylinder in a layer of considerable depth, it being remembered in this connection that in machines of this class where both the upper and lower portions of the layer of grain are fed to the cylinder at the same time the stalk portions of the upper part of the layer will so cover the heads of the lower portion of the layer of grain as to prevent the threshing-cylinder from knocking off the heads of the under portion of the layer of grain as they enter the cylinder; but when the layer of grain is presented to the cylinder with the heads of the top portion some distance in the rear of the heads of the lower portion it is obvious that the threshing-cylinder may strike all of the heads simultaneously and the heads of the under portion of the layer are not covered by the straw of the top portion of the layer. Hence the heads of the grain are readily knocked off by the threshing-cylinder. With a band-cutter and feeder having this kind of feeding device it is possible to use a threshing-cylinder with the threshing-teeth farther apart than in the ordinary machine of this class. Hence the grain will pass through it more rapidly and the capacity of the threshing-machine will be increased. At the same time time its efficiency will not be impaired. Furthermore, in this connection it is to be noted that the device for feeding the upper layer of grain to the threshing-cylinder tends to partially retard the movement of the upper portion of the layer of grain, because the said feeding devices move slower than the feeding-pans. They obviously press downwardly into the top of the layer of grain to a considerable extent, and another particular advantage which they possess is this: When the device is feeding wet or tangled grain or if the grain is passing over the feeding devices in any position other than parallel with the sides of the machine, it is obvious that the cylinder will engage parts of such wheat or tangled mass of grain and will tend to draw the entire mass rapidly into the cylinder. However, the said feeding devices are pressed into the top of such wet or tangled mass of grain, and if the other end of the mass is pulled by the threshing-cylinder the hooked ends of the feeding devices will be forced into the wet or tangled mass, and thereby securely hold it until such time as the feeding devices revolve far enough to permit the mass to drop. By this means the mass of grain will be torn apart and fed to the cylinder piecemeal, and grain that is not in position parallel with the sides of the conveyer will be straightened out before passing to the cylinder.

I have provided means for stopping the conveyer automatically when an excessive quantity of grain is passing between the knife-guards and the feeding-pans, as follows: As before stated, the shaft 61, which drives the feeding-pans, is mounted in bearings on the bars 63, which are capable of vertical movement. To the outer end portions of the said bars I have fixed the rods 101. These rods project straight upwardly and are attached to the levers 102. These levers project inwardly toward the central portion of the machine and are fulcrumed to the supports 103 on the cross-piece 104. Passed upwardly through said cross-piece 104 is a rod 105, fixed to the cross-piece 104. Mounted upon said rod, directly above the cross-piece 104, is an adjustable nut 106, and directly above these nuts the levers 102 are placed, each of said levers having a slot to receive the said bolt. Immediately above the levers is an extensile coil-spring 107 to engage the top surface of the upper lever, and at the top of the rod 105 is an adjustable nut 108. By this means it is obvious that a downward pressure is applied to the inner ends of the lever 102. Hence the outer ends of said levers and the rods 101 are normally held to their upper limit. As these rods connect indirectly with the shaft 61, the said shaft is normally held to its upper limit. If an excessive quantity of grain passes between the shaking-pans and the knife-guards, it is obvious that the shaft of the shaking-pans will be forced downwardly against the pressure of the springs 107. The quantity of grain that may pass between the shaking-pans and guards before the shaft of the shaking-pans is forced downwardly may be regulated by an adjustment of the bolts 30 in the slotted bars 29, thereby vertically adjusting the knife-guards. Pivotally mounted on the side of the machine-frame adjacent to the sprocket-wheel 48 is a lever 109. Adjustably mounted on the lever 109 is a bar 110, and in the said bar 110 the end of the shaft 61 is rotatably mounted. By this means the lever 109 may be adjusted relative to the shaft 61. In the free end of the lever 109 is a hook 111, and this hook is normally in position just beyond the path of the lever 56 of the trip device, and when it is moved downwardly the said hook will engage the lever 56 of the trip device. In practical use, therefore, with this portion of the device it is obvious that when an excessive quantity of grain passes between the knife-guards and the shaking-pans the shaft of the shaking-pans will be forced downwardly against the spring-pressure far enough to force the hook 111 into the path of the lever 56 of the trip device. When this is done, the roller 57 of the trip device will be forced outwardly beyond the path of the projections 52 of the sprocket-wheel 48, and hence the conveyer will be stopped. The conveyer is started again when both hooked levers are out of engagement with the lever 56.

Having thus described each separate feature of my machine, and assuming that the machine is attached to a thresher, it is obvious that as the bundles of grain are thrown upon the conveyer on opposite sides of the dividing-board the staggered arrangement of the cross-strips of the conveyer will operate to advance the bundles into the band-cutter and feeder-frame alternately. The bundles will then be engaged by the band-cutting knives and the bands thereof severed in the ordinary way, the knife-guards being designed to prevent the grain from becoming entangled with the knives. By reason of the central knives having greater thickness than the outer knives the central portion of the grain upon the conveyer will be advanced slightly beyond the side portions thereof. On account of the speed-governor it is obvious that the conveyer will not begin to operate until the threshing-cylinder has reached a certain predetermined rate of speed, and the conveyer will cease to operate as soon as the threshing-cylinder falls below this speed. Under normal conditions the grain after having the bands severed will be distributed evenly over the surface of the feeding-pans, and on account of the greater flow from the central feeding-pans the central portion of the layer of grain will be fed more rapidly than the sides. Then when the grain reaches the upper feeding device the top portion of the layer of grain will be fed more rapidly than the sides. Then when the grain reaches the upper feeding devices the top portion of the layer of grain will be retarded and the lower portion of the layer fed to the cylinder first, and at the same time the central portion of the layer will be fed to the cylinder in advance of the side portions, all of which tends to present the grain to the threshing-cylinder in such manner that the cylinder will strike first the heads of the grain and a continuous row of heads will be constantly fed to the cylinder and not all at one time, as would be the case if the parts of the layer were fed to the cylinder at the same time. Furthermore, the said upper feeding devices will act as hooks to hold bundles of wet or tangled grain from entering the threshing-cylinder bodily. When an excessive quantity of grain is lodged between the knife-guards and the feeding-pans, the feeding-pans will be forced downwardly and the conveyer will be automatically stopped, as before described. A vertical adjustment of the knife-guards provides means whereby the maximum capacity of the machine may be quickly and easily regulated. Furthermore, an adjustment of the lever 109 relative to the block 110 provides means whereby either greater or less depression of the crank-shaft 61 may be sufficient to stop the movements of the conveyer.

Having thus described my invention, what I claim, and desire to secure by Letters Patent of the United States therefor, is—

1. In a band-cutter and feeder, the combination of a frame having a fixed bottom, an endless conveyer to pass over the fixed bottom, said conveyer comprising three parallel chains, a series of cross-bars each fixed at one end to one of the outer chains and at their other ends to the central chain, and a second series of cross-bars each fixed at one end to the remaining outer chain and at their other ends to the central chain, one series of cross-bars being fixed to the central chain at points midway between the ends of the cross-bars of the other series whereby two bundles of grain placed upon the fixed bottom side by side will be carried by the cross-bar one in advance of the other.

2. In a band-cutter and feeder, the combination of a shaft, a blade fixed to the shaft and having a cutting edge projecting in a line radially relative to the shaft, and wings on the sides of the knife, and means for adjusting said wings relative to each other, and a conveyer traveling beneath the knife.

3. In a band-cutter and feeder, the combination of a band-cutting knife, wings fixed to the blade of the knife, projecting outwardly and rearwardly relative to the line of advance of the knife, and having longitudinally-arranged slots therein a wedge-shaped block between the said wings, blades on the outer surfaces of the wings and screws passed through said blades through the slots in the wings and seated in said wedge-shaped block, for the purposes stated, and a conveyer traveling beneath the knife.

4. In a band-cutter and feeder the combination of a rotatable shaft, one or more feeding devices fixed to the shaft to rotate in unison therewith, one or more feeding devices loosely mounted on the shaft, and means for driving each of said loosely-mounted feeding devices, said means comprising a rod or shaft at right angles to the shaft of the feeding devices, a large and a small bevel gear-wheel fixed together and loosely mounted on said rod or shaft, a bevel gear-wheel fixed to the shaft of the feeding devices and in mesh with the smaller one of said bevel gear-wheels, and a bevel gear-wheel fixed to the loosely-mounted feeding device and in mesh with the larger one of the said bevel gear-wheels, the bevel gear-wheel on the feeding device being smaller in diameter than the one in mesh with it, for the purposes stated.

5. In a machine of the class described, the combination with band-cutting mechanism and grain-carrying mechanism, of a shaft above the grain-carrier, one or more hubs on said shaft, two series of radial arms on each hub arranged on opposite sides of the vertical center thereof to engage the grain on the carrier, and a fixed stationary member for each hub to extend parallel with the line of travel of the grain and to project under the hub and between the arms, for the purposes stated.

6. In a band-cutter and feeder the combination of a catch-pan hinged at one end to a suitable support, an auxiliary catch-pan hinged to its delivery end, a fixed cross-piece under the delivery end of the auxiliary catch-pan, bars fixed to the under surface of the auxiliary pan projected upwardly and forwardly to a point under the main feed-pan and then approximately horizontally, brackets on the under surface of the main catch-pan to receive said bar, and detachable pins in said brackets to support said bars whereby when the pins are detached the hinged joint at the point where the auxiliary catch-pan connects with the main catch-pan may bend downwardly so that the delivery end of the auxiliary catch-pan may pass the cross-piece, substantially as and for the purposes stated.

7. In a band-cutter and feeder, the combination of a rotatable shaft, a conveyer driven by said shaft, a sprocket-wheel loosely mounted on said shaft and having one or more radial projections on its hub, a trip device fixed to the hub adjacent to the sprocket-wheel and comprising a body portion fixed to the hub, a lever fulcrumed to the body portion, a roller projecting laterally from said lever toward the projection on the hub of the sprocket-wheel, an arm on the body portion opposite from the end to which the lever is pivoted and curved in a direction toward the lever, an arm on the lever projecting in the direction of the arm on the body portion, an extensile coil-spring having its ends connected with said arms whereby the roller end of the lever is held inwardly in engagement with the projection on the hub of the sprocket-wheel, means for holding said lever in position with this roller out of engagement with the projections, and a governing device for releasing the said lever-holding means when a certain predetermined speed has been attained, and means for constantly rotating said sprocket-wheel during the operation of the machine for the purposes stated.

8. In a band-cutter and feeder, the combination of a rotatable shaft, a conveyer operated by said shaft, a sprocket-wheel loose on said shaft and having one or more projections on its hub, a spring-actuated trip device fixed to said shaft and normally in engagement with the said projection, whereby the trip device and sprocket-wheel are rotated in unison, feeding-pans to receive the grain from the conveyer and carry it toward the threshing-machine, said feeding-pans pivoted at one end to be capable of swinging vertically, yielding pressure devices for normally holding the feeding-pans to their upper limit of movement, a guard above the feeding-pans, means for adjusting said guard relative to the feeding-pans, and a lever connected with the feeding-pans, whereby, when the feeding-pans are forced downwardly by grain upon them, the said lever is forced into the path of the said trip device, to hold the trip device stationary, for the purposes stated.

9. In a band-cutter and feeder, the combination of a rotatable shaft, a conveyer operated by said shaft, a sprocket-wheel loose on said shaft and having one or more projections on its hub, a spring-actuated trip device fixed to the said shaft, and normally in engagement with the said projection, whereby the trip devices and sprocket-wheel are rotated in unison, feeding-pans to receive the grain from the conveyer and carry it toward the threshing-machine, said feeding-pans pivoted at one end to be capable of swinging vertically, yielding pressure devices for normally holding the feeding-pans to their upper limit of movement, a guard above the feeding-pans, a lever fulcrumed at one end to the machine-frame, adjustably connected with the shaft of the feeding-pans and having a hooked end designed to be placed in position where it will engage the said trip device when the feeding-pans are lowered, for the purposes stated.

10. In a band-cutter and feeder, the combination of a rotatable shaft, a conveyer driven from said shaft, a sprocket-wheel loosely mounted on the shaft and having one or more projections on its hub, a spring-actuated trip device fixed to the hub, to normally engage one of said projections and lock the sprocket-wheel and trip device together, a shaft driven from the threshing-machine, a sprocket-wheel thereon, connected with the aforesaid sprocket-wheel, a ball-governor on the latter shaft, a hooked lever fulcrumed to the machine-frame and connected with the governor and arranged to normally hold the trip device out of engagement with the projection on the sprocket-wheel when the machine is at rest, and to release the trip device when actuated by said governor, feeding-pans in the machine-frame, capable of vertical movement, yielding pressure devices for normally holding the feeding-pans to their upper limit of movement, guards above the feeding-pans, and a lever fulcrumed to the machine-frame connected with the shaft of the feeding-pans and having a hook end capable of being forced into the path of the said trip device when the feeding-pans are forced downwardly, for the purposes stated.

11. In a band-cutter and feeder, the combination of a machine-frame, a conveyer in said machine-frame, a knife-bearing shaft fixed to the machine-frame, a series of flat metal guards fixed at one end to the machine-frame, passed under the shaft of the band-cutting knives and projected horizontally some distance beyond the band-cutting knives, a cross-piece connecting the rear ends of said guards, slotted bars fixed to the ends of said cross-piece, bolts passed through the machine-frame and through said slotted bars, whereby the rear ends of the said guards may be adjusted vertically, vertically-adjustable feeding-pans below said guards, yielding pressure devices for normally holding them to their upper limit of movement, and means connected with said feeding-pans, whereby when they are forced downwardly, the conveyer is stopped, for the purposes stated.

ROBERT SHEDENHELM.

Witnesses:
THOMAS G. ORWIG,
W. R. LANE.